(12) United States Patent
Wicaksono et al.

(10) Patent No.: US 11,005,663 B2
(45) Date of Patent: May 11, 2021

(54) SECURE AUDIT SCHEME IN A DISTRIBUTED DATA STORAGE SYSTEM

(71) Applicant: Seagate Technology LLC, Cupertino, CA (US)

(72) Inventors: Nino Wicaksono, Singapore (SG); Jeetandra Kella, Singapore (SG); Muhammad Jawad Alam Wahla, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 359 days.

(21) Appl. No.: 16/102,201

(22) Filed: Aug. 13, 2018

(65) Prior Publication Data
US 2020/0052901 A1    Feb. 13, 2020

(51) Int. Cl.
*H04L 9/06*      (2006.01)
*H04L 9/32*      (2006.01)
*G06F 21/64*     (2013.01)
*G06F 21/78*     (2013.01)
(Continued)

(52) U.S. Cl.
CPC ........ *H04L 9/3242* (2013.01); *G06F 12/0238* (2013.01); *G06F 12/1408* (2013.01); *G06F 21/64* (2013.01); *G06F 21/78* (2013.01); *H04L 9/0643* (2013.01); *G06F 2212/1052* (2013.01); *G06F 2212/251* (2013.01); *H04L 2209/125* (2013.01)

(58) Field of Classification Search
CPC ... H04L 9/3242; H04L 9/0643; H04L 9/0894; H04L 67/1095; H04L 67/1097; H04L 2209/125; G06F 21/64; G06F 21/78; G06F 12/1408; G06F 12/0238; G06F 2212/1052; G06F 2209/125; G06F 3/0623; G06F 3/0688; G06F 3/0647; G06F 11/1076; G06F 2212/251
See application file for complete search history.

(56) References Cited

U.S. PATENT DOCUMENTS 5,802,106 A    9/1998  Packer
6,115,357 A    9/2000  Packer et al.
(Continued)

FOREIGN PATENT DOCUMENTS

WO    2008/112779 A2    9/2008

*Primary Examiner* — Kho V Le
(74) *Attorney, Agent, or Firm* — Hall Estill Attorneys at Law (57) ABSTRACT

Apparatus and method for managing data objects in a distributed data storage system, such as a cloud computing environment. In some embodiments, a data object is encrypted using a user encryption key to generate ciphertext. A first hash function is applied to the ciphertext and an audit encryption key to generate a first hash value. An audit value is formed by combining the ciphertext and the first hash value, and the audit value is locally encrypted and stored to non-volatile memory (NVM) of each of a plurality of storage nodes. An audit process is performed to confirm each of the encrypted replicas store identical copies of the ciphertext. This is carried out by decrypting the ciphertext and applying a second hash function to the ciphertext and the audit encryption key by each storage node to form a plurality of second hash values which are then compared by an audit processor.

20 Claims, 4 Drawing Sheets

(51) Int. Cl.
*G06F 12/14* (2006.01)
*G06F 12/02* (2006.01)

(56) References Cited

U.S. PATENT DOCUMENTS

| | | | |
|---|---|---|---|
| 6,523,115 B1 * | 2/2003 | Ono | H04L 9/0643 |
| | | | 713/168 |
| 7,200,141 B2 | 4/2007 | Chatterjee | |
| 7,363,367 B2 | 4/2008 | Lloyd et al. | |
| 8,433,681 B2 | 4/2013 | Patel et al. | |
| 8,433,849 B2 | 4/2013 | De Schrijver et al. | |
| 8,510,267 B2 | 8/2013 | Barton et al. | |
| 8,527,458 B2 | 9/2013 | Park | |
| 8,935,211 B2 | 1/2015 | Orenstein et al. | |
| 9,135,269 B2 | 9/2015 | Shetty et al. | |
| 9,773,012 B2 | 9/2017 | Cufforth et al. | |
| 2005/0074116 A1 * | 4/2005 | Hall | H04L 9/0643 |
| | | | 380/37 |
| 2005/0198451 A1 | 9/2005 | Kano et al. | |
| 2006/0069862 A1 | 3/2006 | Kano | |
| 2007/0124310 A1 | 5/2007 | Mathur | |
| 2008/0260147 A1 * | 10/2008 | Shin | H04L 9/0643 |
| | | | 380/46 |
| 2010/0104094 A1 * | 4/2010 | Takashima | H04L 9/3073 |
| | | | 380/28 |
| 2010/0205370 A1 | 8/2010 | Ikawa et al. | |
| 2011/0138192 A1 * | 6/2011 | Kocher | H04L 9/3247 |
| | | | 713/189 |
| 2011/0196900 A1 | 8/2011 | Drobychev et al. | |
| 2012/0233134 A1 | 9/2012 | Ikawa et al. | |
| 2013/0226978 A1 | 8/2013 | Bestler et al. | |
| 2017/0272239 A1 * | 9/2017 | Minematsu | H04L 9/0637 |

\* cited by examiner

SECURE AUDIT SCHEME IN A DISTRIBUTED DATA STORAGE SYSTEM

SUMMARY

Various embodiments of the present disclosure are generally directed to an apparatus and method for managing replicated data objects in a distributed data storage system, such as a cloud computing environment.

In accordance with some embodiments, a data object is encrypted using a user encryption key to generate ciphertext. A first hash function is applied to the ciphertext and an audit encryption key to generate a first hash value. An audit value is formed by combining the ciphertext and the first hash value, and the audit value is locally encrypted and stored to non-volatile memory (NVM) of each of a plurality of storage nodes. An audit process is performed to confirm each of the encrypted replicas store identical copies of the ciphertext. In some cases, this is carried out by decrypting the ciphertext and applying a second hash function to the ciphertext and the audit encryption key by each storage node to form a plurality of second hash values which are then compared by an audit processor.

These and other features and advantages of various embodiments can be understood from a review of the following detailed description in conjunction with the accompanying drawings.

DETAILED DESCRIPTION

Without limitation, various embodiments of the present disclosure generally relate to the management of data objects in a distributed data storage system, such as in a cloud computing environment.

Cloud computing generally refers to a network-based distributed data processing environment. Network services such as computational resources, software and/or data are made available to remote users via a geographically distributed network, such as but not limited to the Internet. A cloud computing network can be a public "available-by-subscription" service accessible by substantially any user for a fee, or a private "in-house" service operated by or for the use of one or more dedicated users.

A cloud computing network is generally arranged as an object storage system whereby data objects from users ("account holders" or simply "accounts") are replicated and stored in various storage locations within the system. Depending on the system configuration, the locations may be geographically distributed. The network may be accessed through web-based tools such as web browsers, and provides services to a user as if such services were installed locally on the user's local computer. Other tools can be used including command line tools, etc.

Object storage systems are often configured to be massively scalable so that new storage nodes, servers, software modules, etc. can be added to the system to expand overall capabilities in a manner transparent to the user. An object storage system can continuously carry out significant amounts of background overhead processing to store, replicate, migrate and rebalance the data objects stored within the system in an effort to ensure the data objects are available to the users at all times.

Services are provided within a cloud computing network to perform various functions such as replication, updating and auditing. These operations are carried out in the background and serve to make data available to the various users in an efficient manner. One problem that can arise in a distributed data storage system is the delay between the time that a data object is stored and the time that it takes to replicate the object in other locations. This time lag can be exasperated during times of heavy network traffic. The audit function endeavors to ensure that all replicated objects are up to date and represent the most current version of the user data. Data security concerns, such as local encryption of the data, can make the audit processing inefficient.

Various embodiments of the present disclosure are generally directed to the management of replicated objects in a distributed data storage system. While embodiments may be directed to a cloud processing environment, other applications can include block-storage systems, file storage systems, and any other form of data storage system where replicated data sets (objects) are stored.

As explained below, some embodiments provide a computer network with a plurality of nodes. Services in the form of specialized hardware and/or programmable processing circuits are enacted to perform various functions to facilitate the storage and retrieval of data objects to and from storage nodes within the network. These services may include an accessor processor (agent) and an audit processor (agent).

In some embodiments, the accessor agent receives a data object for storage from a selected user, and encrypts the data object using a user key to generate ciphertext. The user key is an encryption key associated with the selected user. A hash value, such as an HMAC (hash-based message authentication code) is generated by applying a suitable hash function to the ciphertext and an audit key supplied by the audit agent. The audit agent may distribute the audit key to all storage nodes in the network.

Once the hash value has been formed, the accessor agent combines the hash value with the ciphertext to form an audit value. In at least some cases, the ciphertext may be concatenated with the hash value to form the audit value as a combined string. The combined string is distributed to each of a number of storage nodes that are geographically separated. Each storage node receives the same audit value for the associated data object. In alternative embodiments, each storage node separately generates the same audit value using the input user data and the audit key. Regardless, the audit value is identical for each storage node.

Each storage node uses a local storage key to encrypt the audit value to generate ciphertext in the form of an encrypted replica data object (replica). Each local storage key is unique to the associated storage node, so each encrypted replica will be different. The encrypted replicas are stored locally to non-volatile memory (NVM) of the associated storage node. All of the replicas associated with the selected data object are referred to herein, for convenience, as a replica set.

The audit agent periodically performs audit processes upon the various replica sets stored throughout the network. One purpose of the audit can be to verify that each of the replicas in a given replica set have an underlying identical content set and are all up-to-date and represent the most current version.

The audit process includes forwarding a request to each storage node associated with the selected replica set to have the storage node generate a new hash value based on the replica stored by that node. The storage node decrypts the replica internally using the local storage key to return the audit value, extracts the ciphertext portion of the audit value, and generates the hash value such as an HMAC of the extracted ciphertext and the audit key.

These operations provide hash values that are returned to the audit agent for a comparison operation. If the hash values are all equal, the audit agent can use this information to verify that all of the replicas have a data content that is identical. Further verification can take place as desired by, for example, comparing the received hash values to the originally generated hash value to ensure all replicas are the most current version. If one or more of the hash values is different, corrective actions can be taken on the non-compliant nodes, and requests (e.g., read operations) can be serviced from the known good nodes. In further embodiments, the audit agent can maintain an audit list as a data structure that indicates the status of verified replica sets as well as other useful control information.

In this way, an efficient and secure audit process can be carried out. There is no need for the audit agent to have access to the keys used to encrypt the locally encrypted replicas. Depending on the configuration of the system, the hash values can be relatively small, such as 32-bits in length, further reducing network traffic requirements and latency effects.

Figure 1:
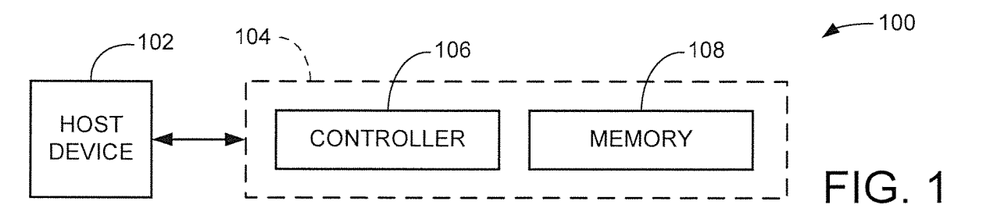
FIG. 1 is a functional representation of a data handling system in accordance with various embodiments of the present disclosure.

These and other features of various embodiments disclosed herein can be understood beginning with a review of FIG. 1 which illustrates a data processing system 100. The data processing system 100 includes a host device 102 operably coupled to a data storage device 104.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, etc. The data storage device 104 may be a hard disc drive (HDD), solid-state drive (SSD), hybrid solid state drive (HSSD), thumb drive, optical drive, an integrated memory module, a multi-device storage enclosure, a storage server, etc.

The data storage device 104 may be incorporated into the host device as an internal component or may be an external component accessible via a communication pathway with the host device 102 including a cabling connection, a wireless connection, a network connection, etc.

The data storage device 104 includes a controller 106 and a memory module 108. The controller 106 may be one or more hardware circuits and/or one or more programmable processor circuits that use associated programming to carry out top level control functions for the storage device. The memory module 104 includes a non-volatile memory (NVM) including one or more forms of rotatable media, semiconductor memory, etc.

Figure 2:
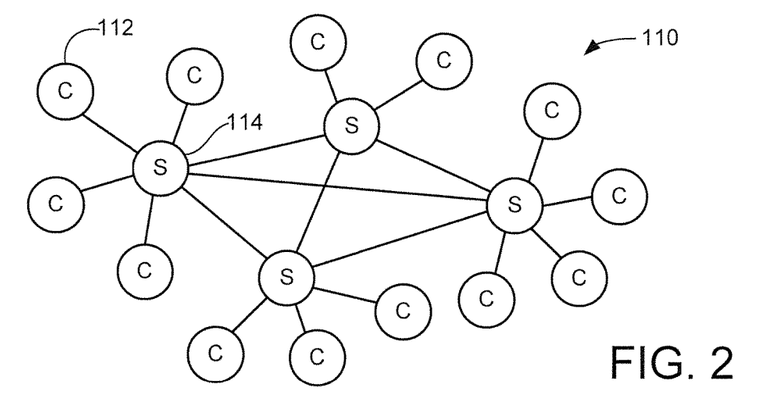
FIG. 2 shows a network of client and server nodes in some embodiments.

FIG. 2 shows a distributed computer network 110. The network 110 has a number of interconnected processing nodes including client (C) nodes 112 and server (S) nodes 114. The client nodes may represent local user systems with host devices and one or more storage devices, as depicted in FIG. 1, and the server nodes may interconnect groups of remotely connected clients as well as have various processing and data storage capabilities.

Generally, any node in the system can communicate directly or indirectly with any other node. The network 110 can be a private network, a public network, or a combination of both public and private networks. The network can be arranged to operate as a cloud computing environment, a RAID mass data storage system, a block-storage system, a file-storage system, etc.

For purposes of the present discussion, it is contemplated that the network 110 incorporates a geographically distributed data storage system in the form of a cloud computing network in which users of the system store and access data sets in the form of data objects. Each data object presented to the system will be subjected to a system replication policy so that multiple copies of the data object (replicas) are stored in different geographic locations, or zones. It is contemplated albeit not required that the system nominally generates and stores three (3) replicas of each data object. This enhances data reliability, but generally increases background overhead processing to maintain the system in an updated state.

Figure 3:
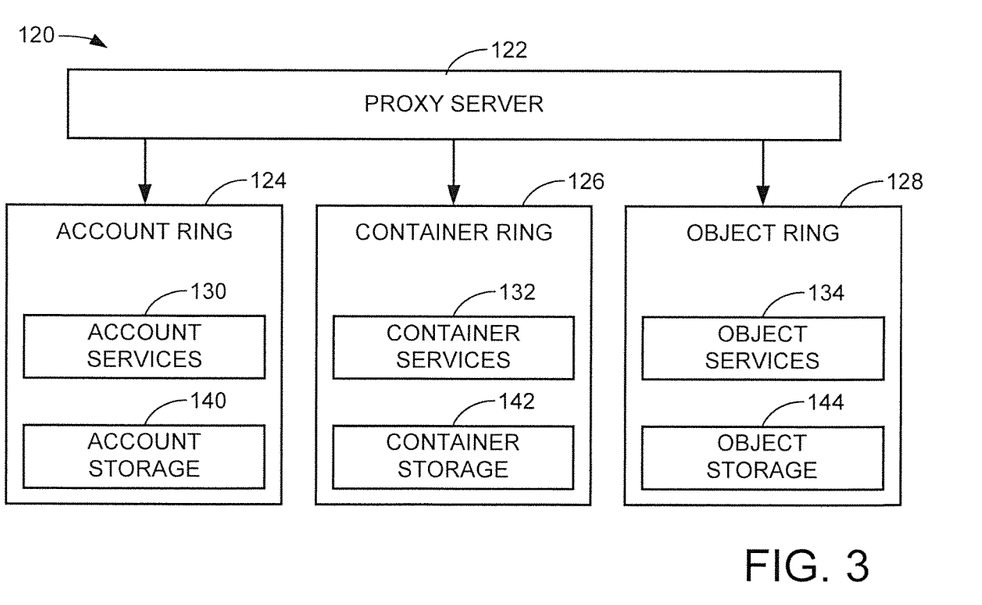
FIG. 3 is a functional representation of an exemplary architecture of a distributed data storage system implemented using the network of FIG. 2.

An example software architecture for the network is represented at 120 in FIG. 3. Other architectures can be used so this is merely for purposes of providing a concrete illustration. A proxy server 122 is formed from the one or more management servers 114 in FIG. 2 and operates to handle overall communications with users of the system, which communicate using the client nodes 112.

The proxy server 122 accesses a plurality of map structures, or rings, to control data flow to the respective data storage devices. The map structures include an account ring 124, a container ring 126 and an object ring 128. Other forms of rings can be incorporated into the system as desired. Generally, each ring is a data structure that maps different types of entities to locations of physical storage. Each ring generally takes the same overall format, but incorporates different hierarchies of data. The rings may be stored in computer memory and accessed by an associated processor during operation.

The account ring 124 provides lists of containers, or groups of data objects owned by a particular user ("account"). The container ring 126 provides lists of data objects in each container, and the object ring 128 provides lists of data objects mapped to their particular storage locations.

Each ring has an associated set of services 130, 132, 134 and storage 140, 142, 144. The storage may or may not be on the same devices. The services and storage enable the respective rings to maintain mapping using zones, devices, partitions and replicas. The services may be realized by software, hardware and/or firmware. In some cases, the services are software modules representing programming executed by an associated processor of the system.

Figure 4:
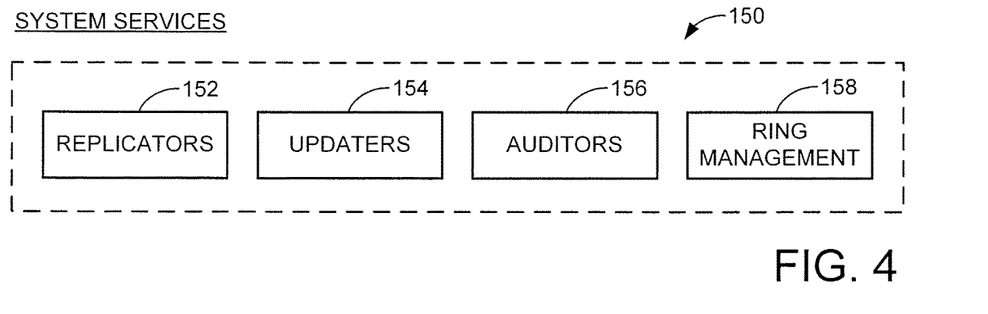
FIG. 4 is a functional representation of selected services used by the system architecture of FIG. 3 in accordance with some embodiments.

FIG. 4 shows various types of services 150 that can be incorporated into the architecture of FIG. 3. These include replicators 152, updaters 154, auditors 156 and ring management modules 158. Other services can be used. Generally, the replicators 152 replicate objects presented for storage, the updaters 154 correct out of sync issues due to failure conditions or periods of high loading when updates cannot be timely serviced, the auditors 156 crawl the local system checking the integrity of objects, containers and accounts, and the ring management module 158 maintains the map (ring) structures.

When processing data objects (e.g., replicas) the system performs two types of operations: local processing and remote processing. Local processing is discussed in FIG. 5, and remote processing is discussed in FIG. 6.

Figure 5:
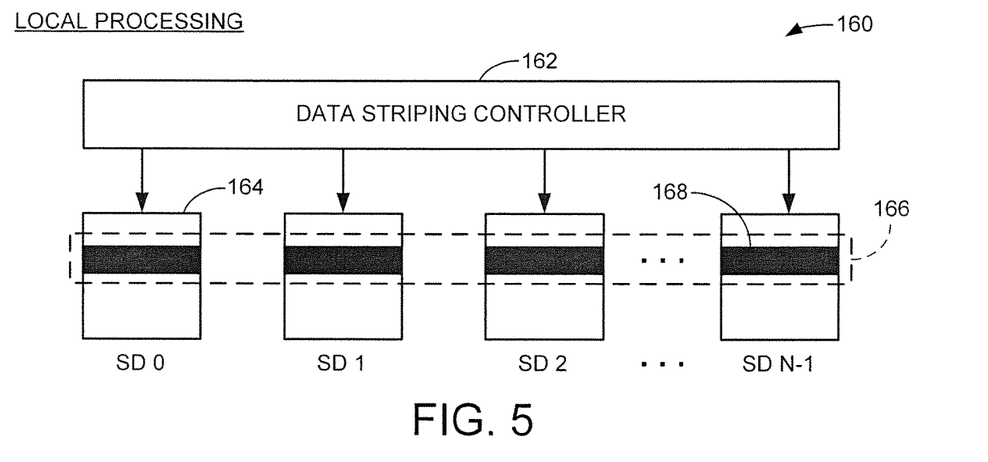
FIG. 5 depicts local processing carried out by the data storage system in some embodiments.

Local processing generally involves striping each replica across multiple local devices, such as storage devices in a particular rack, and encrypting the constituent elements using one or more local encryption credentials (such as local encryption keys that are a function of device, location, user, etc.). To this end, FIG. 5 shows aspects of a local storage node 160 having a data striping controller 162 and a plural number N storage devices 164 (labeled SD 0 to SD N–1). The controller 162 may take the form of one or more hardware circuits and/or one or more programmable processor circuits that execute software/firmware programming instructions. The storage devices 164 can take any suitable form including those described above for the memory 104 in FIG. 1, including hard disc drives (HDDs), solid state drives (SSDs), hybrid solid state drives (HSSDs), etc.

Each replica 166 is formatted into N stripes 168 with each stripe stored in a different one of the storage devices 164. RAID (redundant array of independent discs) techniques such as RAID-5, RAID-6, etc. may be applied so that one or more of the stripes 168 constitute parity data. This provides fault tolerance, allowing the replica 166 to be recovered even in the event of the failure or one or more of the storage devices.

Figure 6:
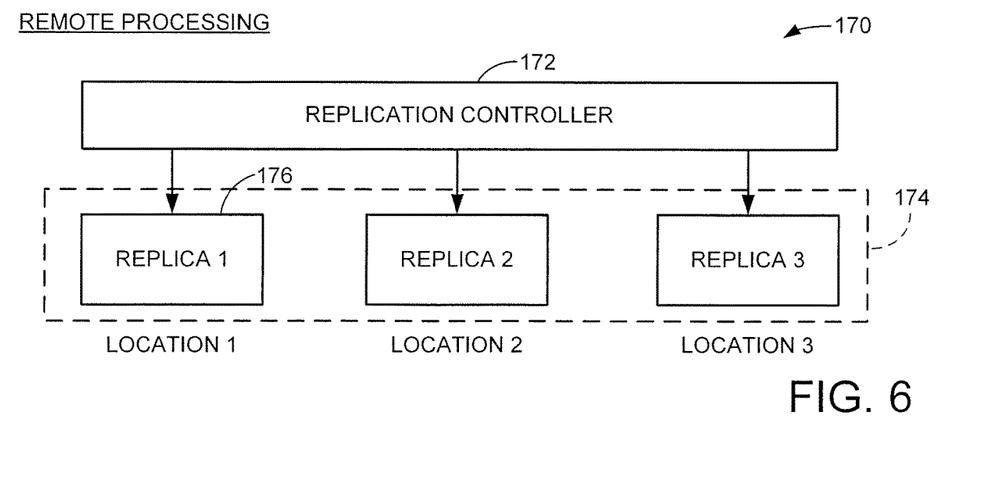
FIG. 6 depicts remote (distributed) processing carried out by the data storage system in some embodiments.

Remote processing generally involves replicating each object a number of times (such as at least three replicas in a Swift based architecture) so that the different replicas are stored in geographically distributed locations. For clarity of discussion, all copies of a given object, including the originally received object, are referred to herein as replicas.

FIG. 6 shows aspects of a processing node 170 having a replication controller 172. The replication controller 172 may take the form of hardware/software/firmware circuits and operates to provide replica sets 174 having multiple replicas 176 that are geographically distributed to different locations. While each replica set 174 is contemplated as having a total of three (3) replicas 176, other plural numbers of replicas can be used including greater than or less than three. Each replica 176 is subjected to local processing per FIG. 5.

Figure 7:
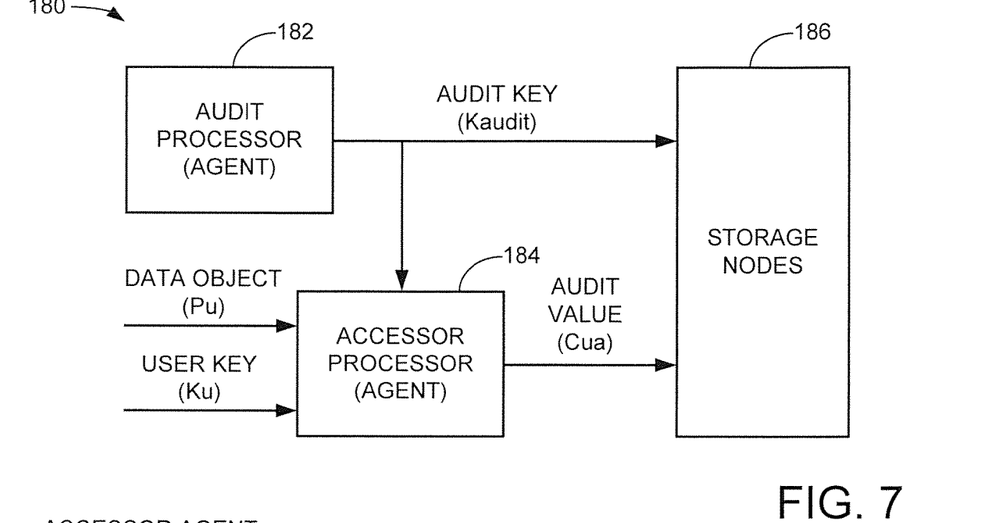
FIG. 7 depicts a secure audit management system in accordance with some embodiments.

FIG. 7 shows a replica management circuit 180 constructed and operated in accordance with some embodiments of the present disclosure to manage the remote and local processing of replicas from FIGS. 5-6. Aspects of the circuit 180 can be realized using hardware/software/firmware as desired. The circuit 180 includes an audit processor 182 and an accessor processor 184. These elements cooperate to communicate with the storage nodes in the network 110, collectively represented by block 186. In some cases, the accessor processor processing can be carried out at the respective storage nodes, or in a separate circuit.

The audit processor 182, also referred to herein as the audit agent, forms a portion of the auditor services 156 from FIG. 4 and generally operates to perform audits on replica sets stored by the storage nodes 186. As part of this audit function, the audit processor 182 distributes a set of cryptographic audit credentials to each of the nodes, as well as to the accessor processor (agent) 184. The audit credentials are in the form of a universal encryption key (audit key) which is denoted as Kaudit.

The accessor agent 184, which forms a portion of the replication and updating services 154 from FIG. 4, uses various inputs including the user data to be stored and a set of cryptographic user credentials. The data to be stored is referred to as a data object and is denoted as Pu. The data object may be in the form of unencrypted plaintext. The user credentials are in the form of a user key Ku. Both these elements are supplied (directly or indirectly) by the associated user during a write operation to write the data object to the network 110.

Figure 8:
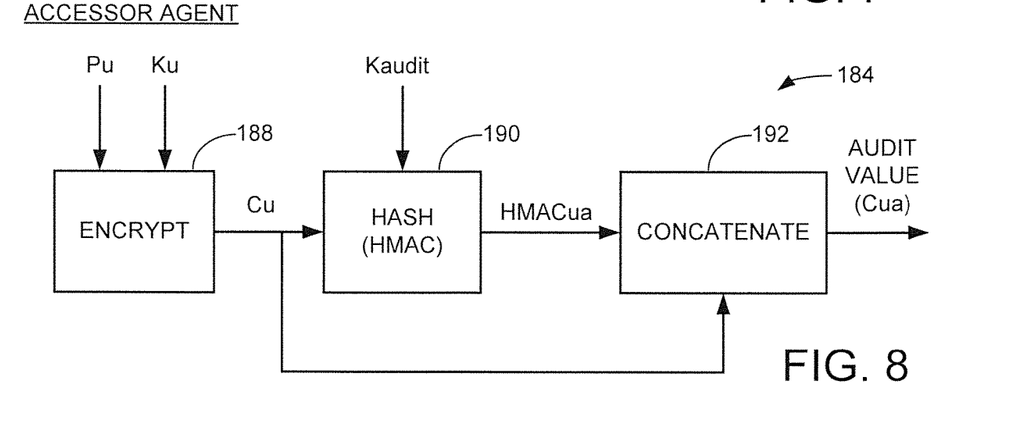
FIG. 8 shows operations carried out by an audit processor (agent) of the system of FIG. 7 in some embodiments.

FIG. 8 shows operation of the accessor agent 184 in some embodiments. The agent 184 includes an encryption block 188, a hash block 190 and a concatenation module 192. Other arrangements can be used.

The encryption block 188 operates to encrypt the data object Pu using the user key Ku to form ciphertext Cu. This can be expressed as follows:

$$Cu=E(Ku,Pu) \quad (1)$$

where the function E(key, data) represents a symmetric encryption operation. The ciphertext Cu is subjected to a hash function by the hash block 190. In some embodiments, the hash function comprises an HMAC (hash-based message authentication code) function. The hash function combines both the ciphertext Cu and the audit key Ku to generate an output hash value HMACua as follows:

$$HMACua=HMAC(Kaudil,Cu) \quad (2)$$

where HMAC(term 1, term 2) represents a suitable hash function operative upon the respective terms. Any suitable hash functions, including MD5 and SHA hashes, can be used as desired. As will be recognized, HMACs tend to generate fixed sized output hash values (e.g., X bits such as 32-bits in this case) irrespective of the lengths of the input terms.

The concatenation block 192 next combines the hash value HMACua with the ciphertext Cu to form a combined string Cua as follows:

$$Cua=Cu\|HMACua \quad (3)$$

where "$\|$" represents appending the second term to the first term. While equation (3) shows the appending of the hash value to the end of the string, the hash value can be combined in other ways such as to the first part of the string. Other combinations can be used as well, including the use of combinatorial logic or other data embedding techniques to embed the hash value into the ciphertext, etc. Ultimately, so long as the respective ciphertext and the hash value can be subsequently separated and extracted, the output is considered a combined string.

The combined string Cua is also referred to as an audit value. This value will be the same for each storage node involved in storing the replica set (see e.g., FIGS. 5 and 6). It is contemplated that the audit value Cua will have a bit length corresponding to the bit length of the encrypted user data (Cu, such as several gigabytes, etc.) plus the bit length of the hash (HMACua, such as 32-bits).

In some cases, the accessor agent calculates and forwards the audit value Cua to each of the storage nodes. In other embodiments, the accessor agent operates locally at each storage node so that the storage node uses the received Pu, Ku and Kaudit values to separately formulate the audit value Cua. Regardless, unless an error has occurred, the audit value Cua will be identical at every storage node; that is, the exact same bit pattern will be present at each storage node.

Figure 9:
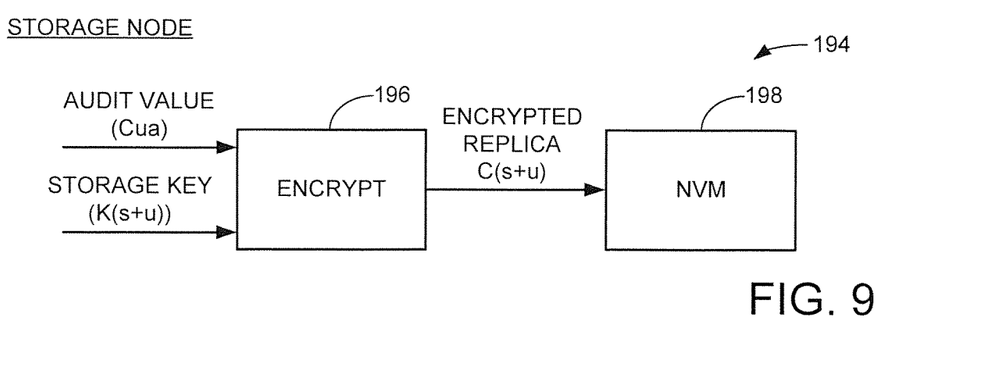
FIG. 9 shows operations carried out by a selected storage node from FIG. 7 in some embodiments.

FIG. 9 shows the operation of a selected storage node 194 from the population of storage nodes 186 in FIG. 7. Each storage node used to store the replica set will operate in similar fashion.

The storage node 194 is shown to include a second encryption block 196 and a non-volatile memory (NVM) 198. The encryption block 196 uses a local storage key K(s+u) that is unique to the storage node 194 to encrypt the audit value Cua to generate an encrypted replica C(s+u) as follows:

$$C(s+u)=E(K(s+u),Cua) \quad (4)$$

The encrypted replica C(s+u) will be unique for each storage node 194 based on the use of a different storage key at each node. The encrypted replica is thereafter stored to the NVM 198 such as using the local processing discussed above in FIG. 5. It is contemplated that the K(s+u) encryption key is maintained internally by the storage node, such as within one or more of the storage devices, and is not discoverable or transferable across the network.

From FIGS. 7-9, it will be appreciated that the remote processing of FIG. 6 results in the distribution of encrypted replicas to each of the different locations, with each encrypted replica having the same content in unencrypted form (e.g., Cua), but a different bit sequence in encrypted form (e.g., C(s+u)).

Figure 10:
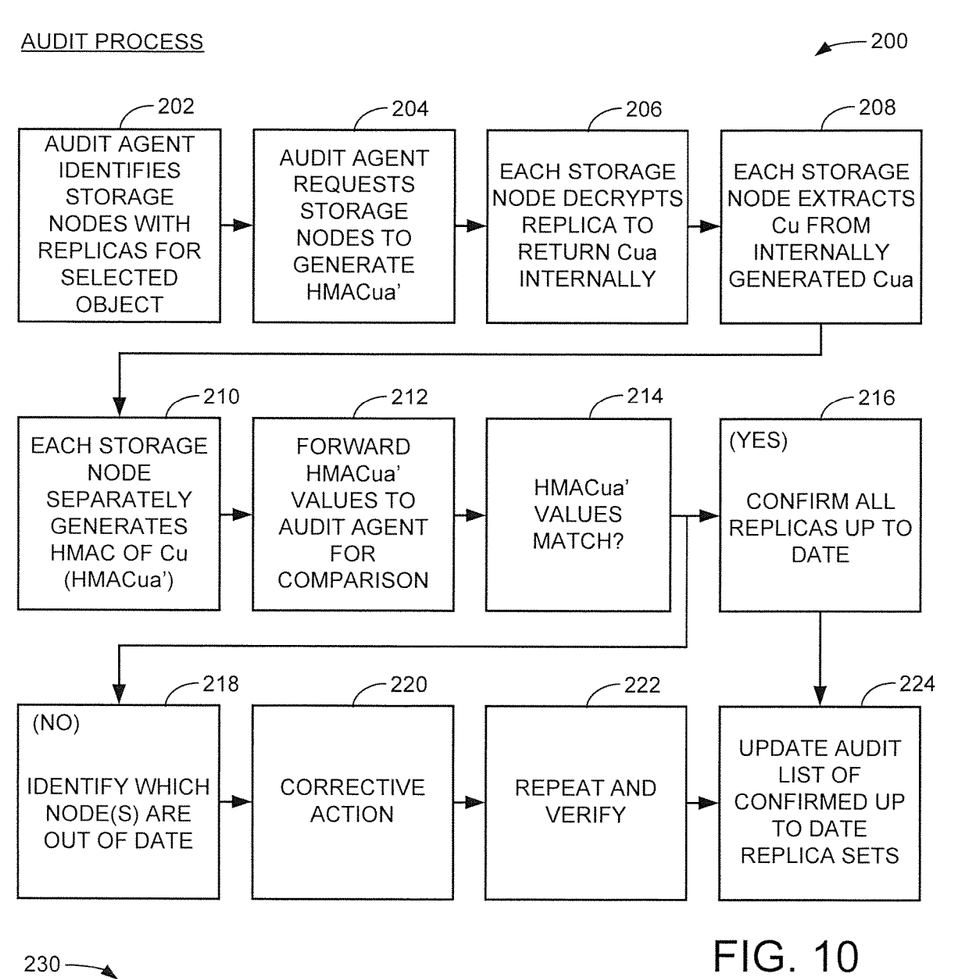
FIG. 10 is a sequence diagram illustrating an audit process carried out by the audit agent of FIG. 7 in some embodiments.

FIG. 10 shows a sequence diagram for an audit process 200 that is subsequently carried out by the audit agent 182 of FIG. 7 after the storage of the various replicas in a replica set. In practice, it is contemplated that the audit processing is a background operation whereby the audit agent crawls the system, looking for updated replica sets with a view toward ensuring consistency among the various members of each set. Various other steps may be carried out in conjunction with those shown in FIG. 10 as desired.

As shown by block 202, the sequence begins with the audit agent identifying the particular storage nodes (e.g., 194) having replicas for a selected object (see e.g., FIG. 6).

Once these nodes are identified, at block 204 the audit agent communicates a request to each node to generate a new hash value HMACua' based on the contents of the existing replicas C(s+u) stored at each node. At this point it will be noted that, if everything is correct, the newly calculated hash values HMACua' will match the earlier calculated hash value(s) HMACua from equation (2) when the replicas were first generated and stored.

At block 206, each storage node operates independently and in parallel to service the request from the audit agent. This includes retrieving and decrypting the associated replica C(s+u) to internally return a value Cua', as follows:

$$Cua'=E(K(s+u),C(s+u)) \quad (5)$$

As noted above, E(key, data) from equation (4) is a symmetric encryption function, so applying the key K(s+u) to the data stored to the NVM (C(s+u)) serves as a decryption operation and returns a combined string Cua'.

At block 208, each storage node extracts a set of ciphertext Cu' from the combined string Cua', and then generates, at block 210, the requested HMACua' value as follows:

$$HMACua'=HMAC(Kaudit,Cu') \quad (6)$$

The extracted HMACua' values are forwarded to the audit agent 182 at block 212 for a comparison operation. It will be recalled that in the present example, each of these extracted values is 32-bits in length. Using three replicas in the replica set, these are respectively referred to as HMACua1', HMACua2' and HMACua3'.

Block 214 shows the operation of the auditor agent 182 in testing whether the following statement is true:

$$HMACua1'=HMACua2'=HMACua3' \quad (7)$$

In further embodiments, the originally generated HIMACua hash value may have been previously stored by the audit agent 182, in which case the audit agent 182 may compare each of the returned hash values to the original value, as so:

$$HMACua=HMACua1'=HMACua2'=HMACua3' \quad (8)$$

If the respective hash values match, the flow continues to block 216 where the audit agent 182 confirms that all replicas are current and up to date. On the other hand, if one or more of the hashes do not match, the flow passes to block 218 where the non-conforming nodes are identified, and corrective action is taken at block 220 to resolve the error. Various types of corrective action may take place; the hashes may be recalculated, the ciphertext from a known-good node may be forwarded, etc. Regardless, the foregoing verification steps are repeated at block 222 to ensure that all nodes match and are up to date.

Once it is determined that all hashes match, the flow continues to block 224 where an audit list is updated. This may represent a data structure maintained by the audit agent 182 that lists those objects in the system that have been verified as being correct. In some cases, control information such as time/date stamps may be incorporated into the data structure. The audit agent may use the table as a list of objects to evaluate, with different statuses shown for those that have been cleared versus those that require verification, etc.

In further embodiments, the accessor agent 184 (FIG. 5) or other service may be used to service read requests, in which case the accessor agent (or other service) may reference the table in order to identify acceptable nodes from which the requested data objects may be retrieved. For example, if an audit process has not been completed for a particular object, the accessor may use the storage node that first received the data, etc.

Figure 11:
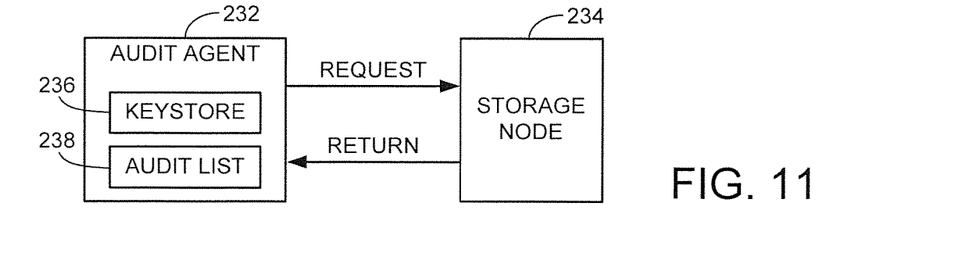
FIG. 11 illustrates interaction between the audit agent of FIG. 8 and the storage node of FIG. 9 in some embodiments.

FIG. 11 is a functional representation of a processing system 230 that includes an audit agent 232 and a storage node 234. These elements are similar to those described above. The audit agent 232 includes a keystore 236 and an audit list 238. The keystore is an internal memory location that stores the audit key Kaudit that is distributed to the various storage nodes, including storage node 234, as required. The audit list 238 is a data structure as described above that provides the verification status of the various replica sets in the system.

The data exchanges required to execute an audit process as in FIG. 10 are relatively straightforward. Basically, the audit agent 232 can issue a request to perform an audit for a particular replica. The storage node 234 performs the decryption and hash calculations in FIG. 10 and returns the requested hash value for further processing. Both communications have a small footprint and should not significantly inhibit ongoing network traffic. The decryption and hash functions can be carried out by the local storage controller (see e.g., controller 106 in FIG. 1). In some cases, a peer to peer arrangement can be used such that a given storage node can send the request to the other storage nodes and process the results.

It will now be appreciated that the various embodiments present a number of benefits. An efficient audit process is proposed whereby each storage node generates or receives an audit value in the form of a combined string having ciphertext and a hash value related to a particular data object replicated within the system. The storage nodes proceed to separately encrypt the replicas using local credentials. There is no need for the audit process to have access to these local encryption credentials, which enhances security of the system. The use of short hash values (e.g., 32-bits, etc.) enable fast and efficient audit process comparisons to ensure the data sets match without the need to expose the data sets onto the network.

The systems embodied herein are suitable for use in cloud computing environments as well as a variety of other network environments. Data storage devices in the form of HDDs, SSDs and HSSDs have been illustrated but are not limiting, as any number of different types of media and operational environments can be adapted to utilize the embodiments disclosed herein It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
encrypting a data object received by a distributed data storage system using a user encryption key to generate ciphertext;
applying a first hash function to the ciphertext and an audit encryption key to generate a first hash value;
combining the first hash value and the ciphertext to form an audit value;
distributing an identical copy of the audit value to each of a plurality of storage nodes in the distributed data storage system;
replicating the data object by encrypting the respective audit value received by each of the plurality of storage nodes in the distributed data storage system using a different local encryption key for each storage node to form a different encrypted replica and storing the encrypted replica in a non-volatile memory (NVM) of each storage node; and
performing an audit process to confirm the encrypted replicas store identical copies of the ciphertext by, for each storage node, retrieving the associated different encrypted replica from the associated NVM, decrypting the encrypted replica to locally recover a copy of the ciphertext, applying a second hash function to the recovered copy of the ciphertext to generate a second hash value, and transferring the second hash value to a management server, the management server confirming that each of the second hash values from each of the storage nodes match the first hash value, the audit process confirming that each of the plurality of storage nodes stores the same ciphertext without requiring access, by an audit agent, to the different local encryption keys used by the storage nodes, thereby enhancing security and reducing network traffic requirements and latency effects.

2. The method of claim 1, wherein the audit process does not include a transfer of the recovered copy of the ciphertext from any of the storage nodes to the management server as part of the audit process.

3. The method of claim 2, wherein the first and second hash values each comprise an HMAC (hash-based message authentication code).

4. The method of claim 1, wherein the audit process comprises comparing the associated second hash value from each of the plurality of storage nodes, and confirming that each of the encrypted replicas store identical copies of the ciphertext responsive to each of the second hash values being equal.

5. The method of claim 1, wherein each of the first and second hash values are 32 bytes or less in length, and wherein the ciphertext is at least one gigabyte in length.

6. The method of claim 1, wherein the combining step comprises concatenating the ciphertext with the first hash value to form the combined string.

7. The method of claim 1, wherein an accessor processor generates the audit value and transmits the audit value to each of the plurality of storage nodes.

8. The method of claim 1, wherein an accessor processor forwards the data object to each of the plurality of storage nodes and each of the plurality of storage nodes performs the applying and combining steps in parallel.

9. The method of claim 1, wherein an audit processor forwards the audit encryption key to each of the plurality of storage nodes, and wherein each storage node generates the second hash value using the audit encryption key received from the audit processor.

10. The method of claim 9, wherein the audit processor further operates to generate an audit list as a data structure in a memory that lists a result of the audit process.

11. A distributed data storage system comprising:
an accessor processor circuit arranged as at least one programmable processor having associated programming instructions in an associated memory configured to encrypt a selected data object received from a selected user using a user encryption key to generate ciphertext, to apply a first hash function to the ciphertext and an audit encryption key to generate a first hash value, and to combine the first hash value and the ciphertext to form an audit value;
a plurality of storage nodes each comprising at least one data storage device comprising a controller circuit and a non-volatile memory (NVM), each storage node configured to receive an identical copy of the audit value from the accessor processor circuit, use the controller circuit to encrypt the audit value using a different local encryption key to form an encrypted replica and to store the encrypted replica in the associated NVM; and
an audit processor circuit arranged as at least one programmable processor having associated programming instructions in an associated memory configured to perform an audit process to confirm each of the storage nodes store identical copies of the ciphertext by comparing each of a plurality of second hash values respectively generated by the plurality of storage nodes, each storage node performing a local decryption of the associated encrypted replica using the associated local encryption key to locally retrieve the ciphertext, applying a second hash function to the decrypted ciphertext using the audit encryption key to generate the associated second hash value, and transferring the respective second hash value to the audit processor circuit without transferring the locally retrieved ciphertext, the audit processor circuit confirming that each of the plurality of storage nodes stores the same ciphertext without requiring access to the different local encryption keys used by the storage nodes, thereby enhancing security and reducing network traffic requirements and latency effects.

12. The system of claim 11, wherein each of the storage nodes comprises a plurality of data storage devices, and wherein the encrypted replica generated by each storage node is striped across the plurality of data storage devices of the storage node.

13. The system of claim 12, wherein the plurality of data storage devices comprise at least a selected one of a hard disc drive (HDD), a solid state drive (SSD) or a hybrid solid state drive (HSSD).

14. The system of claim 11, wherein the audit processor determines that each of the second hash values returned from the storage nodes match the first hash value to confirm that each storage node stores identical ciphertext.

15. The system of claim 14, wherein each of the plurality of storage nodes forwards the associated second hash value to the audit processor circuit for comparison thereby.

16. The system of claim 11, wherein the first and second hash functions are identical and each comprises an HMAC (hash-based message authentication code) function that produces an output value of X bits.

17. The system of claim 11, wherein the audit processor circuit does not have access to a copy of each of the different local encryption keys used by the respective storage nodes.

18. A replication controller circuit for use in a cloud computing network having a plurality of storage nodes each configured to store user data in the form of encrypted, replicated data objects, the replication controller circuit comprising:

an accessor processor circuit arranged as at least one programmable processor having associated programming instructions in an associated memory configured to encrypt a selected data object using a user encryption key associated with a selected user to generate ciphertext, to apply a first hash function to the ciphertext and an audit encryption key to generate a first hash value, to combine the first hash value and the ciphertext to form an audit value, to transfer an identical copy of the audit value to each of the plurality of storage nodes, to direct each of the plurality of storage nodes to encrypt the audit value using a different local encryption key to form a unique encrypted replica, and to store the encrypted replica in a non-volatile memory (NVM) of the associated storage node; and an audit processor circuit arranged as at least one programmable processor having associated programming instructions in an associated memory configured to distribute the audit encryption key to each of the storage nodes and to perform an audit process to confirm each of the encrypted replicas store identical copies of the ciphertext by comparing each of a plurality of second hash values respectively generated by the plurality of storage nodes using the distributed audit encryption key, each storage node performing a local decryption of the associated encrypted replica to locally retrieve the ciphertext, applying a second hash function to the decrypted ciphertext to generate the associated second hash value, and transferring the respective second hash value to the audit processor circuit without transferring the locally retrieved ciphertext, the audit processor circuit confirming that each of the plurality of storage nodes stores the same ciphertext without requiring access to the different local encryption keys used by the storage nodes, thereby enhancing security and reducing network traffic requirements and latency effects.

19. The network of claim 18, wherein the first and second hash functions are each characterized as an MD5 or SHA function.

20. The system of claim 18, wherein the audit processor circuit is further configured to compare each of the second hash values from the plurality of storage nodes to the first hash value to confirm that each of the encrypted replicas represent a most current version of the selected data object.

* * * * *